United States Patent [19]

Orchard

[11] Patent Number: 4,511,164
[45] Date of Patent: Apr. 16, 1985

[54] TUBE SECURING MECHANISM

[75] Inventor: Rolf O. Orchard, Manhattan Beach, Calif.

[73] Assignee: Puritan Bennett Corp., Carlsbad, Calif.

[21] Appl. No.: 326,126

[22] Filed: Nov. 30, 1981

[51] Int. Cl.³ .............................................. F16L 33/12
[52] U.S. Cl. .................................... 285/252; 285/239; 285/369; 285/383; 285/420; 285/423; 285/DIG. 16; 285/DIG. 22; 24/270
[58] Field of Search .................... 24/270, 273, 16 PB, 24/285, 17 A, 17 B, 17 AP; 285/243, 252, 365, 369, 409, 383, 420, 423, 260, 239, DIG. 22, DIG. 16; 128/334 C, 346, DIG. 26

[56] References Cited

U.S. PATENT DOCUMENTS

| 2,366,067 | 12/1944 | Smith | 285/DIG. 22 |
| 2,504,881 | 4/1950 | Russell | 24/270 X |
| 2,550,034 | 4/1951 | Allen | 24/270 X |
| 3,217,400 | 11/1965 | Illesy et al. | 285/260 X |
| 3,552,778 | 1/1971 | Muller | 285/260 X |
| 4,128,918 | 12/1978 | Wenk | 285/DIG. 22 |
| 4,381,585 | 5/1983 | Morel | 24/270 |

FOREIGN PATENT DOCUMENTS 825564 10/1969 Canada ............................... 285/260

Primary Examiner—Dave W. Arola
Attorney, Agent, or Firm—Fulwider, Patton, Rieber, Lee & Utecht

[57] ABSTRACT

A tube securing mechanism for retaining a resilient tube on a rigid tube connector, for use in a patient breathing circuit of a respirator. In one embodiment of the invention, the tube securing mechanism is a clamp (22) having a circular band (30) with a peripheral break in it, and two integral arcuate portions (32 and 34) hinged to the band and to each other, to form a toggle mechanism by means of which the clamp is opened and closed. A pair of integral teeth (50) on the band and another pair (52) on one of the arcuate portions of the clamp, engage each other to protect the hinges of the clamp from unnecessary stress. In another embodiment of the invention, a tube (10) has two internal annular features (64 and 66) that are complementary to corresponding annular features (60 and 62) on a connector (12'), to hold the tube more securely on the connector.

3 Claims, 5 Drawing Figures

U.S. Patent  Apr. 16, 1985  4,511,164
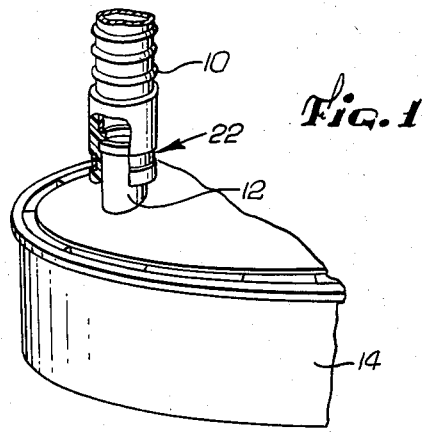
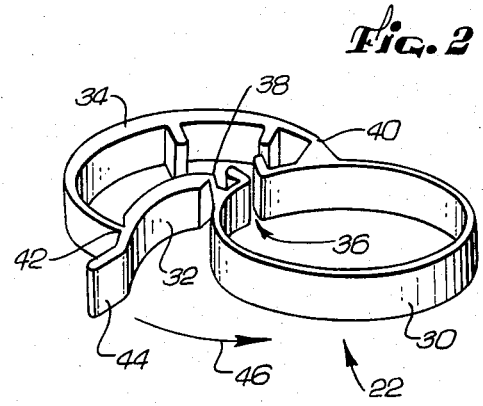
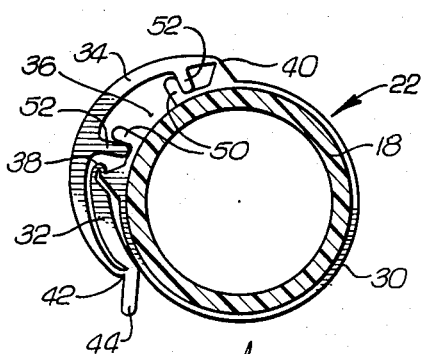
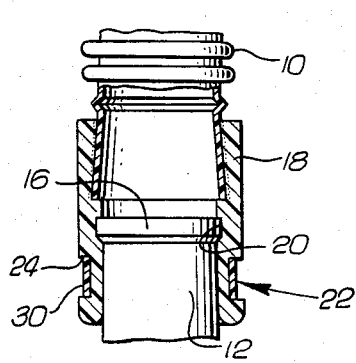
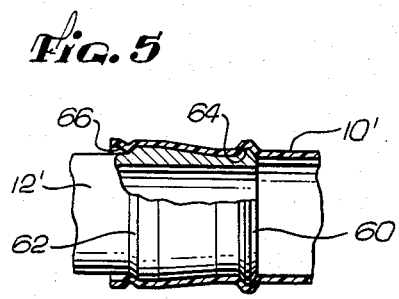

TUBE SECURING MECHANISM

BACKGROUND OF THE INVENTION

This invention relates generally to mechanisms for securing tubes to tube connectors. More particularly, the invention relates to tube securing mechanisms for use in respirators.

A respirator or ventilator provides a regulated flow of breathing gas to a patient, typically during inhalation therapy, which may be administered for a variety of reasons. A respirator uses a system of tubes, referred to as the patient breathing circuit, to direct the flow of gas to and from the patient's lungs. Gas supplied to the patient may also pass through a humidifier, which typically both heats and humidifies the gas, and some of the added moisture will usually condense out from the gas after it leaves the humidifier. This humidifier action, together with the heat and moisture derived from the patient's lungs, provides a warm and humid environment for the tubes of the patient breathing circuit.

The tubes are usually made of polyethylene or a similar flexible material, and the various tube connectors and fittings are of a more rigid plastic material. Securing tubes to their connectors and fittings in warm and moist conditions has proved to be a significant problem in the design and operation of respirators. Typically, tubes are manufactured with an end portion that includes an annular groove, which engages with a corresponding ridge or flange on the fitting. Frequently, however, such arrangements that work perfectly well under cool, dry conditions are impractical or unreliable in warm moist conditions. Warm temperatures and the presence of moisture render the polyethylene tube material both more pliable and more slippery in contact with the tube connectors. As a result, tubes can sometimes be removed from their fittings inadvertently. There has therefore been a significant need for a respirator tube securing mechanism that operates reliably under moist and warm conditions. Ideally, such a mechanism must also be simple to operate and relatively inexpensive to manufacture, since both the tubes and their securing mechanisms may be produced as disposable items. The present invention satisfies all these needs.

SUMMARY OF THE INVENTION

The present invention resides in a novel tube securing means for preventing inadvertent removal of a tube from a fitting to which it is connected, even in conditions of high temperature and humidity. In accordance with one preferred embodiment of the invention, the tube securing means takes the form of a one-piece clamp installed over an end portion of the tube once it has been placed on a tube fitting. Briefly, and in general terms, the tube clamp of the invention comprises a circular band, continuous expect for a single peripheral break to facilitate installation and removal of the clamp, and first and second arcuate portions integral when the circular band. The first arcuate portion has one end integrally hinged to the band at a first hinge point on one side of the break, and the second arcuate portion, which is longer than the first, has one end integrally hinged to the band at a second hinge point on the other side of the break, and its other end integrally hinged to the first arcuate portion at a third hinge point.

The clamp has an open position, in which the first and second arcuate portions extend out from the band in a relatively unstressed condition and the break may be widened to faciliate placement of the clamp on the tube. The clamp is movable from the open position to a closed position in which the first and second arcuate portions are folded into an approximately concentric relationship with the band. In the closed position, tensile forces in the second arcuate portion act between the second and third hinge points along a line falling inside the first hinge point, to maintain the closed position by toggle action. The first arcuate portion of the clamp also includes an end tab by means of which the clamp is opened and closed.

In accordance with another important aspect of the invention, the band of the clamp also includes two outwardly extending integral teeth, located one on each side of the break and between the first and second hinge points. There are also two inwardly extending integral teeth on the second arcuate portion of the clamp, positioned such that in the closed position the two outwardly extending teeth are disposed between and in contact with corresponding ones of the two inwardly extending teeth. Tensile stress in the band is then transmitted to the second arcuate portion of the clamp through the teeth, rather than through the hinge points. Since the hinge points are of a relatively thin cross section and are subject to damage in tension, the teeth play an important role in increasing the reliability of the clamp. Without the teeth, the clamp would be subject to breakage if the tube were inadvertently or deliberately pulled from the fitting by force.

In accordance with another embodiment of the invention, a tube end portion has a first internal annular groove, and an internal annular shoulder closer to its end. The annular groove engages with a corresponding annular ridge on the tube connector, and the internal shoulder engages a corresponding annular shoulder on the connector. It has been found that this arrangement alone, without the use of a separate clamp, provides for substantially increased retention forces acting on the tube, and prevents inadvertent removal of the tube in many cases.

It will be appreciated from the foregoing that the present invention represents a significant advance in the field of tube securing mechanisms for use in patient breathing circuits of respirators. Both embodiments of the invention prevent inadvertent removal of tubes from their connectors, even in moist and warm conditions. Both embodiments are also simple to manufacture and well suited for production as disposable items. Other aspects and advantages of the present invention will become apparent from the following more detailed description, taken in conjunction with the accompanying drawings.

BRIEF DESCRIPTION OF THE DRAWINGS

FIG. 1, is a perspective view of a tube coupled to a connector on a vaporizer in a patient breathing circuit;

FIG. 2 is a perspective view of a tube clamp embodying the principles of the present invention;

FIG. 3 is an end view, partly in section, of the clamp of FIG. 2 shown in a closed position over a tube;

FIG. 4 is a sectional view of the end portion of the tube on which the tube clamp has been installed; and FIG. 5 is an elevational view, partly broken away and shown in section, of a different type of tube securing mechanism.

DESCRIPTION OF THE PREFERRED EMBODIMENTS

As shown in the drawings for purposes of illustration, the present invention is concerned with mechanisms for clamping or securing resilient tubing to tube connectors or fittings, particularly for use in respirators. In the past, tubes used in a respirator breathing circuit could be inadvertently removed from fittings, especially under warm, moist conditions.

In accordance with the invention, means are provided for securing a resilient tube, such as the one shown at reference numeral 10 in FIG. 1, to a tube connector 12. The connector 12 is part of a humidifier subsystem 14 used to add moisture to a flow of gas to be inhaled by a patient. Inlet air flowing toward the patient is supplied through the tube 10 to the connector 12, and leaves the humidifier 14 through a similar connector and tube (not shown). Disconnection of the tube 10 from the connector 12, would terminate the flow of gas to the patient.

As best shown in FIG. 4, the connector 12 includes a flange 16 at its end. The tube 10 has an end portion 18 molded or otherwise integrally formed with the tube. The end portion 18 has an internal annular groove 20 sized and shaped to fit around the flange 16 when the tube 10 is coupled to the connector 12. Although this arrangement would be sufficient to retain the tube 10 on the connector 12 in cool, dry conditions, inadvertent removal can sometimes occur under moist and warm conditions.

In accordance with a principal aspect of the invention, the tube end portion 18 is held more securely on the connector 12 by means of a tube clamp 22 installed over the end portion 18 in an annular groove 24. As best viewed in FIGS. 2 and 3, the clamp 22 includes a circular band 30, a first arcuate portion 32 and a second arcuate portion 34, all fabricated as a single molded part. The band 30 is continuous except for a single peripheral break indicated at 36. The first arcuate portion 32 has one end integrally hinged to the band 30 at a first hinge point 38, located close to and on one side of the break 36. The second arcuate portion 34 has one end integrally hinged to the band at a second hinge point 40 close to and on the other side of the break 36.

The second arcuate portion is integrally hinged to the first arcuate portion at a third hinge point 42. The third hinge point 42 is near, but not at the end of the first arcuate portion 32, which also includes a flat end tab 44 to facilitate operation of the clamp. When the clamp 22 is in an open position, as shown in FIG. 2, the arcuate portions 32 and 34 extend outwardly from the band 30 in a relatively unstressed condition, and the gap 36 may be expanded in order to install the clamp over the tube end portion 18. When the band 30 has been installed in the groove 24, the clamp 22 is closed by moving the first arcuate portion 32 in the direction shown by arrow 46. The arcuate portions 32 and 34 are then folded to an approximately concentric relationship with the band 30. The closed position is shown in FIG. 3.

The arcuate portions 32 and 34 are dimensioned such that a toggle action is provided as the clamp is closed. In the closed position, a retaining force is supplied by tension in the second arcuate portion 34 acting between the second and third hinge points 40 and 42. In the closed position, the line of action of this retaining force falls inside the first hinge point 38 and prevents opening of the clamp unless the tab 44 is lifted.

In accordance with another important aspect of the invention, the band 30 includes a pair of outwardly extending teeth 50 located one at each side of the break 36. A corresponding pair of inwardly extending teeth 52 are formed integrally with the second arcuate portion of 34. In the closed position, the outwardly extending teeth 50 engage between the two inwardly extending teeth 52. Tension in the band 30 is then transferred to the arcuate portion 34 through the teeth 50 and 52. Any increased tension in the band 30 results in increased tension in the arcuate portion 34, specifically in that region between the inwardly extending teeth 52. This relieves the hinge points 38, 40 and 42 from any unnecessary stress and prevents breakage of the hinge points in the event that an attempt is made to remove the clamp 22 by pulling on the tube 10.

The hinge points 38, 40 and 42 are tapered to approximately 0.015 inch (approximately 0.38 mm). In accordance with a well known principle, some materials, such as polypropylene actually become stronger in bending stress when reduced to this thickness. Although polypropylene is the preferred material, high density polyethylene may be used for the clamp 22. The tube end portion 18 may be of low density polyethylene with a small percentage of ethylene vinyl acetate added for flexibility. Of course, the materials are still subject to breakage under tensile stress, but the provision of the teeth 50 and 52 obviates this problem.

In accordance with an alternative embodiment of the invention, a tube, indicated at 10', is secured to a tube connector 12', as shown in FIG. 5. The connector 12' includes an external ridge 60 at its end. The diameter of the connector increases gradually over a distance of about one tube diameter measured in from the ridge 60, and then decreases more steeply to form a sloping annular shoulder 62. The tube 10' includes an internal annular groove 64, for engagement with the ridge 60 on the connector 12', and an internal annular ridge 66 close to its end, one side of which engages with the shoulder 62 on the connector. When the tube 10' is installed over the connector 12', there is engagement of the groove 64 with the ridge 60 and almost simultaneous engagement with the ridge 66 over the shoulder 62. With this arrangement, removal of the tube 10' from the connector 12' is extremely difficult, even in warm, moist conditions.

It will now be appreciated that the present invention represents a significant advance in the field of tube securing mechansims, especially such mechanisms for use in respirators. The invention provides a strong but relatively inexpensive one-piece clamp that may be easily installed to secure a tube on a tube fitting or connector, but is almost impossible to remove or break inadvertently. In addition, the invention provides a tube securing means that employs two interlocking complementary portions to inhibit removal of the tube from its connector. It will also be understood that, although specific embodiments of the invention have been described in detail for purposes of illustration, various modifications may be made without departing from the spirit and scope of the invention. Accordingly, the invention is not to be limited except as by the appended claims.

I claim:

1. A one-piece plastic tube clamp for use in a respirator breathing circuit, said tube clamp comprising:

a circular band, continuous except for a single peripheral break to facilitate installation and removal of the clamp;

a first arcuate portion having one movable end and one end integrally hinged to said band at a first hinge point on one side of the break;

a second arcuate portion longer than said first arcuate portion and having one end integrally hinged to said band at a second hinge point on the other side of the break and another end integrally hinged to said first arcuate portion at a third hinge point;

two outwardly extending integral teeth located on said band, one on each side of the break and between the first and second hinge points; and two inwardly extending integral teeth on said second arcuate portion, positioned such that, in the closed position, the two outwardly extending teeth are between and in contact with the two inwardly extending teeth, and tensile stress in said band is transmitted to said second arcuate portion through said teeth rather than through the hinge points;

the clamp having an open position in which said arcuate portions extend out from said band in a relatively unstressed condition, and a closed position in which said arcuate portions are folded into an approximately concentric relationship with said band, and tensile forces in said second arcuate portion act between the second and third hinge points, along a line falling inside the first hinge point, to maintain the closed position by toggle action.

2. A one-piece plastic tube clamp as set forth in claim 1, wherein:

said clamp is of polypropylene; and the first, second and third hinge points are defined by regions of a decreased thickness of approximately 0.015 inch.

3. A one-piece plastic tube clamp as set forth in claim 1, wherein the third hinge point is close to the movable end of said first arcuate portion, which also includes an integral tab to facilitate movement between the open and closed positions.

* * * * *